United States Patent
Iwanami et al.

(10) Patent No.: US 6,467,281 B2
(45) Date of Patent: Oct. 22, 2002

(54) VAPOR-COMPRESSION REFRIGERANT CYCLE FOR VEHICLE

(75) Inventors: Shigeki Iwanami, Okazaki (JP); Keiichi Uno, Kariya (JP); Takayoshi Matsuno, Okazaki (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/985,147

(22) Filed: Nov. 1, 2001

(65) Prior Publication Data

US 2002/0053212 A1 May 9, 2002

(30) Foreign Application Priority Data

Nov. 8, 2000 (JP) .................................. 2000-340654

(51) Int. Cl.[7] .................................................. B60H 1/32
(52) U.S. Cl. ........................................... 62/133; 62/244
(58) Field of Search .............................. 62/228.1, 239, 62/244, 133, 323.4

(56) References Cited

U.S. PATENT DOCUMENTS

| | | | | |
|---|---|---|---|---|
| 4,823,555 A | | 4/1989 | Ohkumo | |
| 4,890,460 A | * | 1/1990 | Takasi et al. | 62/180 |
| 5,452,587 A | * | 9/1995 | Honda et al. | 62/244 |
| 5,867,996 A | * | 2/1999 | Takano et al. | 62/323.3 |
| 6,073,456 A | * | 6/2000 | Kawai et al. | 62/133 |
| 6,244,232 B1 | * | 1/2001 | Ban et al. | 123/142.5 R |
| 6,220,517 B1 | * | 4/2001 | Ichishi et al. | 62/244 |
| 6,230,505 B1 | * | 5/2001 | Noda et al. | 62/323.4 |
| 6,230,507 B1 | * | 5/2001 | Ban et al. | 62/323.4 |
| 6,237,675 B1 | * | 5/2001 | Oehring et al. | 62/244 |
| 6,371,202 B1 | * | 4/2002 | Takano et al. | 62/244 |

FOREIGN PATENT DOCUMENTS

JP          3-58927 B2    9/1991

* cited by examiner

Primary Examiner—William E. Tapolcai
Assistant Examiner—Mohammad M. Ali
(74) Attorney, Agent, or Firm—Law Offices of David G. Posz

(57) ABSTRACT

In a refrigerant cycle for a vehicle air conditioner, a compressor is operated by a power from a vehicle engine, a load detecting unit is disposed to detect load of the engine, an electromagnetic clutch is turned off so that a consumed power consumed in the compressor is reduced to zero when the load detected by the load detecting unit is equal to or larger than a first threshold value. In the refrigerant cycle, the first threshold value is set to be changed along a power-cutting curved line in such a manner that an increase rate of the first threshold value relative to the vehicle speed becomes larger as the vehicle speed becomes larger.

14 Claims, 5 Drawing Sheets

VAPOR-COMPRESSION REFRIGERANT CYCLE FOR VEHICLE

CROSS-REFERENCE TO RELATED APPLICATION

This application is related to Japanese Patent Application No. 2000-340654 filed on Nov. 8, 2000, the contents of which are hereby incorporated by reference.

BACKGROUND OF THE INVENTION

1. Field of the Invention

The present invention relates to a vapor-compression refrigerant cycle for a vehicle, having a compressor which sucks and compresses refrigerant using a power from a driving source (e.g., engine) for travelling the vehicle.

2. Description of Related Art

In a conventional vehicle air conditioner with a vapor-compression refrigerant cycle, generally, a part of power of an engine for travelling the vehicle is supplied to a compressor through an electromagnetic clutch. Therefore, in an engine having a relatively small displacement, when the vehicle accelerates or is traveling on an uphill road, driveability of the vehicle is deteriorated. Here, the driveability means a vehicle speed change relative to an operation amount of an acceleration pedal.

For example, in JP-B2-3-58927, an acceleration state is determined from a throttle opening degree, and an electromagnetic clutch is turned off so that a power transmission from an engine to a compressor is interrupted when the throttle opening degree of the vehicle is larger than a predetermined degree. However, in this case, the on/off operation of the electromagnetic clutch is repeatedly performed because the throttle opening degree of the vehicle is changed even when the vehicle is travelling with a fixed speed. Accordingly, it is difficult to improve the driveability in the vehicle.

SUMMARY OF THE INVENTION

In view of the foregoing problems, it is an object of the present invention to provide a refrigerant cycle for a vehicle having a compressor operated by power from a driving source for travelling the vehicle, which improves driveability in the vehicle.

According to the present invention, in a refrigerant cycle for a vehicle being travelled by a driving source, a compressor is operated by a power from the driving source to suck and compress refrigerant, a load detecting unit is disposed to detect load of the driving source, a vehicle speed detecting unit is disposed for detecting a vehicle speed, and a power reducing unit reduces a consumed power consumed in the compressor when the load detected by the load detecting unit is equal to or larger than a first threshold value. In the refrigerant cycle, a control unit for controlling operation of the compressor sets the first threshold value in such a manner that an increase rate of the first threshold value relative to the vehicle speed becomes larger as the vehicle speed becomes larger. Accordingly, driveability of the vehicle can be improved.

Preferably, the first threshold value is set based on the vehicle speed detected by the vehicle speed detecting unit to be approximately equal to a value obtained by multiplying a load of the driving source, determined based on the vehicle speed, and a predetermined number together. In this case, the driveability of the vehicle can be further improved.

Alternatively, the first threshold value is set to be larger as the vehicle speed detected by the vehicle speed detecting unit becomes larger, in such a manner that a relationship between the first threshold value and the vehicle speed approximates to a secondary function. In a normal throttle opening-degree curved line Lo, showing a relationship between the vehicle speed and the throttle opening degree when the vehicle is travelling on a flat road in a state without an air flow, a relationship between the first threshold value and the vehicle speed has the secondary function. Therefore, the driveability in the vehicle can be further improved.

Further, the control unit includes power-returning means, the power-returning means stops power-reducing operation of the power reducing unit so that power consumed in the compressor is returned when the load detected by the load detecting unit is equal to or smaller than a second threshold value smaller than the first threshold value, and the control unit sets the second threshold value in such a manner that a difference between the first threshold value and the second threshold value becomes larger as the vehicle speed detected by the vehicle speed detecting unit becomes larger. Therefore, consumed power consumed in the compressor can be readily returned while the driveability of the vehicle is improved.

More preferably, the control unit sets a prohibition area when the vehicle speed is larger than a predetermined speed, and the control unit prohibits power-reducing operation of the power reducing unit in the prohibition area. Therefore, when the vehicle is travelling. in a high speed higher than the predetermined speed, hunting in the compressor can be prevented.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be described hereinafter with reference to the accompanying drawings. In this embodiment, a refrigerant cycle of the present invention is typically used for a vehicle air conditioner.

Figure 1:
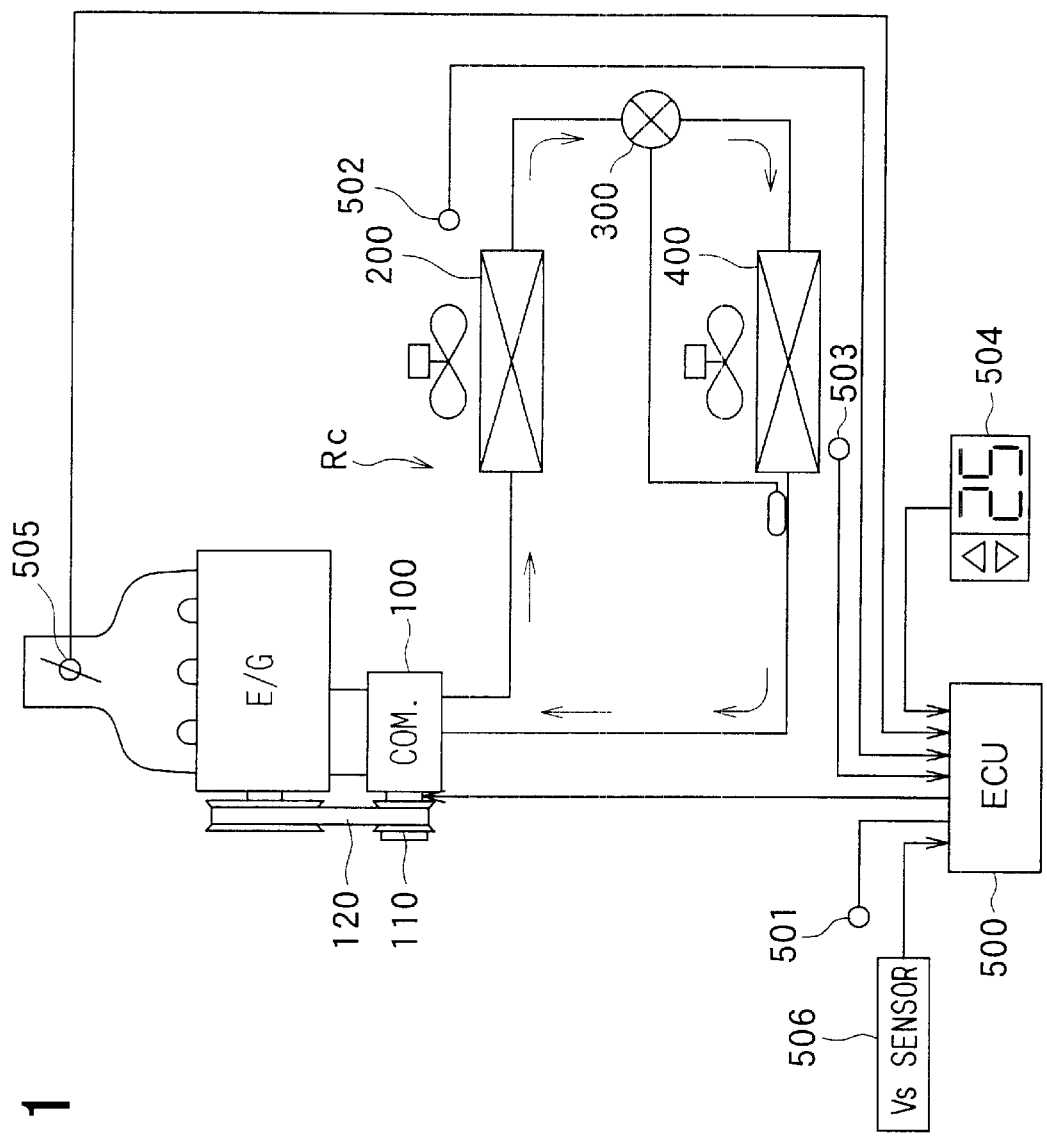
FIG. 1 is a schematic diagram of a vapor-compression refrigerant cycle for a vehicle air conditioner, according to a preferred embodiment of the present invention.

As shown in FIG. 1, in a refrigerant cycle Rc, a compressor 100 is driven by an engine (E/G) for travelling a vehicle, to suck and compress refrigerant. The compressor 100 is connected to the vehicle engine E/G through an electromagnetic clutch 110 and a V-belt 120. The electromagnetic clutch 110 is disposed to interrupt a power transmission from the engine E/G to the compressor 100.

A condenser 200 is disposed to perform a heat exchange between refrigerant discharged from the compressor 100 and outside air. Therefore, refrigerant discharged from the compressor 100 is cooled and condensed in the condenser 200 by outside air. A decompression unit 300 is disposed so that refrigerant discharged from the condenser 200 is decompressed in the decompression unit 300. An evaporator 400 is disposed so that refrigerant decompressed in the decompression unit 300 is heat-exchanged with air blown into a passenger compartment of the vehicle. Therefore, refrigerant is evaporated in the evaporator 400, and air blown into the passenger compartment is cooled by the evaporation of refrigerant.

In this embodiment of the present invention, the decompression unit 300 is a thermal expansion valve in which a valve opening degree is adjusted so that a heating degree of refrigerant sucked into the compressor 100 becomes a predetermined degree.

An inside air temperature sensor 501 is disposed to detect temperature of inside air inside the passenger compartment, an outside air temperature sensor 502 is disposed to detect temperature of outside air outside the passenger compartment, an evaporation temperature sensor 503 is disposed to detect an air temperature (temperature of the evaporator 300) immediately after passing through the evaporator 300, and a temperature setting panel 504 is disposed to manually set an interior temperature desired by a passenger.

A potentiometer 505 (load detection unit) is disposed to detect a throttle opening degree θ of an intake throttle valve disposed in an intake pipe for supplying intake air to the engine E/G, so that load of the engine E/G is detected. A vehicle speed sensor 506 is disposed to detect a vehicle speed Vs.

Temperatures detected by the sensors 501–503, a set value of the temperature setting panel 504, a throttle opening degree detected by the potentiometer 505 and a vehicle speed Vs detected by the vehicle speed sensor 506 are input into an electronic control unit (ECU) 500. The ECU 500 controls air-conditioning components such as the electromagnetic clutch 110, an air mixing door (not shown), an air-conditioning blower and a mode door.

Figure 2:
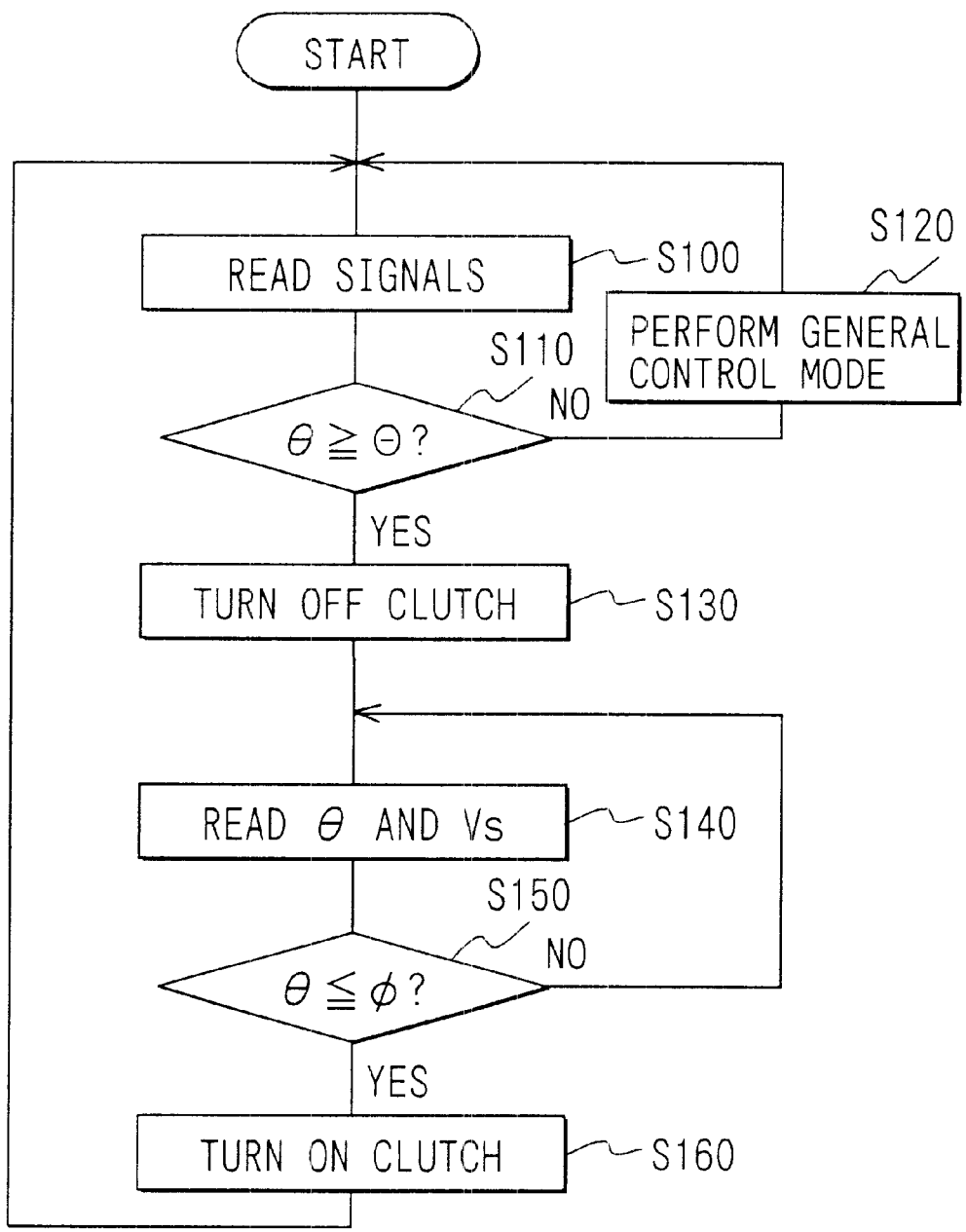
FIG. 2 is a flow diagram showing control operation of an electromagnetic clutch in the refrigerant cycle according to the embodiment.

Next, operation of the refrigerant cycle Rc according to this embodiment will be now described. FIG. 2 is a flow diagram showing a control operation of the refrigerant cycle Rc. When operation of a vehicle air conditioner starts, signals from the sensors 501–503, the temperature setting panel 504, the potentiometer 505 and the vehicle speed 506 are input into the ECU 500 at step S100. Next, at step S110, a first threshold value Θ (calculated throttle opening degree θ') corresponding to the detected vehicle speed Vs, is calculated based on a graph shown by the solid line L1 in FIG. 3, and it is determined whether or not the throttle opening degree θ detected by the potentiometer 505 is equal to or larger than the first threshold value Θ. When the detected throttle opening degree θ is smaller than the first threshold value Θ, a general air-conditioning control mode is performed at step S120. In the general air-conditioning control mode, the air mixing door, the blower, the mode doors and the like are controlled based on the detection temperatures of the sensors 501–503 and the set value of the temperature setting panel 504.

When it is determined that the detected throttle opening degree θ is equal to or larger than the first threshold value Θ, the electromagnetic clutch 110 (power reducing unit) is turned off, and an electrical power supply from the engine E/G to the compressor 100 is stopped so that electrical power consumed in the compressor 100 is reduced to zero, at step S130.

Next, the vehicle speed Vs and the throttle opening degree θ are detected at step S140. Then, at step S150, a second threshold value φ (calculated throttle opening degree θ') corresponding to the vehicle speed Vs detected at step S140 is calculated based on a graph shown by the line L2 in FIG. 3, and it is determined whether or not the throttle opening degree θ detected by the potentiometer 505 is equal to or smaller than the second threshold value φ. When the detected throttle opening degree θ is larger than the second threshold value φ, the electromagnetic clutch 110 is turned off, and power consumed in the compressor 100 is made zero. On the other hand, when the detected throttle opening degree θ is equal to or smaller than the second threshold value φ, the electromagnetic clutch 110 is turned on, and the compressor 100 is operated at step S160.

Figure 3:
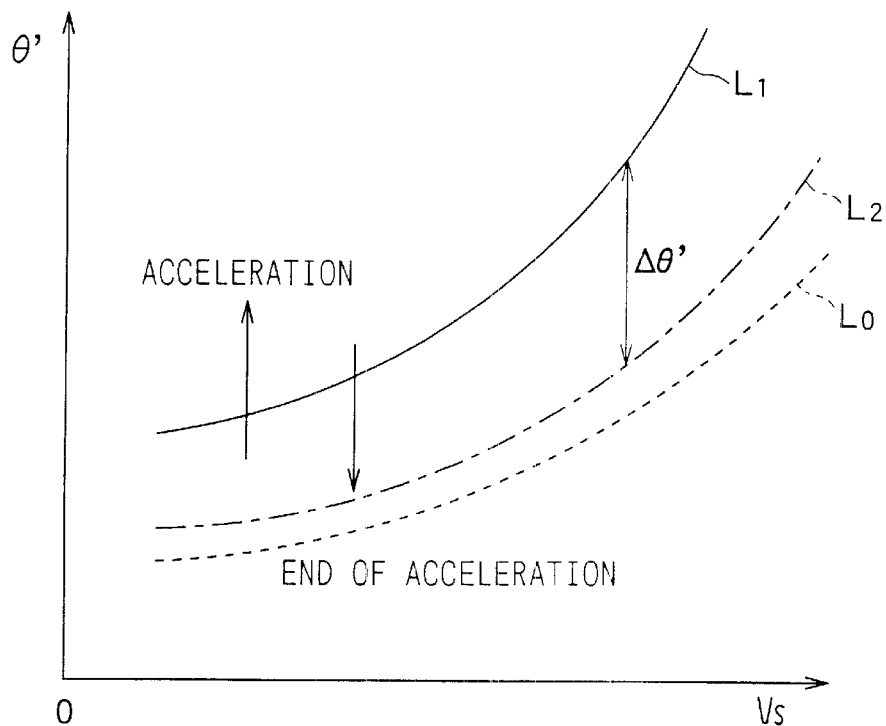
FIG. 3 is a graph showing a relationship between a calculated throttle opening degree θ' (threshold value) and a vehicle speed Vs, according to the embodiment.

Next, the graphs L1, L2, Lo shown in FIG. 3 will be now described. The broken line Lo shown in FIG. 3 is a normal throttle opening-degree curved line Lo showing a relationship between a throttle opening degree (engine load) and a vehicle speed Vs in a vehicle travelling on a flat road in a state without an air flow. An air resistance or a friction resistance increases as the vehicle speed increases. Therefore, in the graph Lo of FIG. 3, the throttle opening degree θ' (engine load) is increased in a secondary function relative to the increase of the vehicle speed Vs. That is, the relationship between the calculated throttle opening degree θ' and the vehicle speed Vs approximate to the secondary function. The graph L1 (power-cutting curved line L1), showing the relationship between the first threshold value Θ and the vehicle speed Vs, has a shape approximately similar to that of the normal throttle opening-degree curved line Lo. Further, the graph L1 is set so that the first threshold value Θ determined by the line L1 becomes larger than the throttle opening degree determined by the normal throttle opening-degree curved line Lo.

Further, the curved line L2 (power-return curved line L2) is set so that a difference Δθ' between the first threshold value Θ and a second threshold value φ becomes larger as the vehicle speed Vs becomes larger. Therefore, the graph L2, showing the relationship between the second threshold value φ and the vehicle speed Vs, has a shape approximately similar to that of the graph Lo.

According to this embodiment of the present invention, a relationship between the power obtained from the engine E/G and the vehicle speed Vs is not changed linearly. That is, in this embodiment, the first threshold value Θ is changed in accordance with the vehicle speed Vs along the power cutting curved line L1 having a shape approximately similar to the normal throttle opening-degree curved line Lo. Therefore, driveability of the vehicle can be improved.

According to experiments of the present inventors of the present application, if the on/off control of the electromagnetic clutch is performed in accordance with a change of the throttle opening degree, the on/off operation of the electromagnetic clutch 110 is repeatedly performed, and the driveability is deteriorated.

According to the embodiment of the present invention, the first and second threshold values are determined based on the vehicle speed Vs which changes slowly as compared with the throttle opening degree. Therefore, the repeat on/off operation of the electromagnetic clutch 110 can be prevented, and hunting in the compressor 100 can be restricted.

In addition, the first threshold value Θ and the second threshold value φ are set, so that the difference Δθ' between the first threshold value Θ and the second threshold value Θ is made larger as the vehicle speed Vs becomes larger. Therefore, power can be readily re-supplied to the compressor 100 without decreasing the driveability.

Although the present invention has been fully described in connection with preferred embodiments thereof with reference to the accompanying drawings, it is to be noted that various changes and modifications will become apparent to those skilled in the art.

Figure 4:
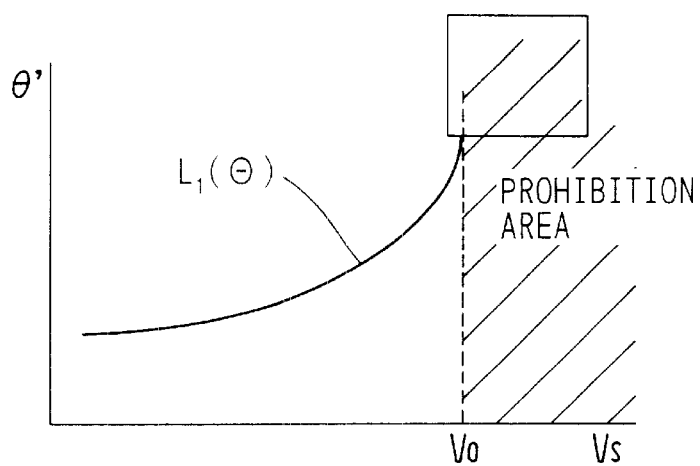
FIG. 4 is a graph showing a relationship between a calculated throttle opening degree θ' and a vehicle speed Vs, according to a modification of the embodiment.

For example, the shape of the graph L1 can be set in such a manner that an increase rate (ΔΘ/ΔVs) of the first threshold value Θ to the vehicle speed Vs becomes larger as the vehicle speed Vs becomes larger. In this case, as shown in FIG. 4, a prohibition area can be provided when the vehicle speed Vs is equal to or larger than a predetermined speed Vo. That is, in the prohibition area where the vehicle speed Vs is equal to or larger than the predetermined speed Vo, the turning-off operation of the electromagnetic clutch 110 (power reducing unit) is prohibited. Accordingly, when the vehicle is travelling in a high speed equal to or larger than the predetermined speed Vo in FIG. 4, it can restrict hunting in the compressor 100.

The first threshold value Θ (the graph L1) can be set to be approximately equal to a value obtained by multiplying the engine load determined based on the vehicle speed Vs and a predetermined number. Here, the engine load is the throttle opening degree θ' calculated based on the above-described normal throttle opening-degree curved line Lo. Even in this case, similarly to that in FIG. 4, the prohibition area can be provided in an area where the vehicle speed Vs is equal to or larger than the predetermined speed Vo, and the operation of the electromagnetic clutch 110 (power reducing unit) is prohibited in the prohibition area.

Because the normal throttle opening-degree curved line Lo approximates to the secondary function, the graph L1 can be set so that the relationship between the first threshold value Θ and the vehicle speed Vs approximates to the secondary function. Even in this case, similarly to that in FIG. 4, the prohibition area can be provided in the area where the vehicle speed Vs is equal to or larger than the predetermined speed Vo, and the operation of the electromagnetic clutch 110 (power reducing unit) is prohibited in the prohibition area. Accordingly, the hunting in the compressor 100 can be prevented when the vehicle speed is equal to or larger than the predetermined speed or is smaller than the predetermined speed.

In the above-described embodiment of the present invention, the engine load is detected by detecting the throttle opening degree using the potentiometer 505. However, the engine load can be detected by using the other load detecting means. For example, the engine load can be detected by an intake negative pressure in an intake pipe or a change of an engine rotation speed. Further, in the above-described embodiment of the present invention, the graph L1 (power-cutting curved line) for setting the first threshold value Θ and the graph L2 (power-returning curved line) for setting the second threshold value φ can be changed for each gear position of a transmission of the vehicle.

Figure 5:
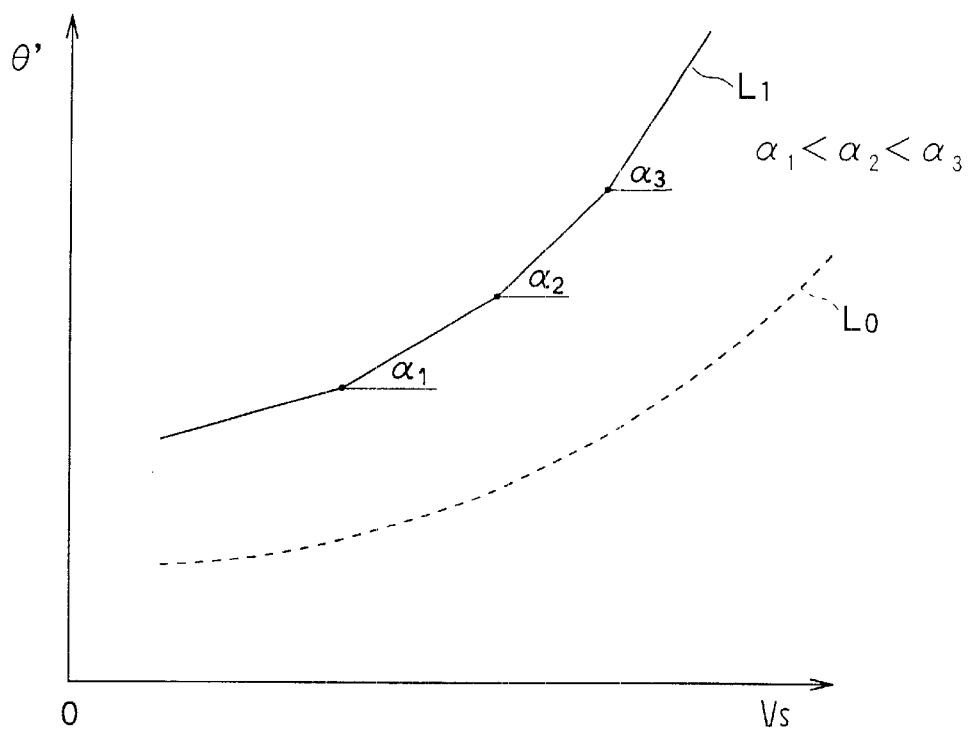
FIG. 5 is a graph showing a relationship between a calculated throttle opening degree θ' and a vehicle speed Vs, according to an another modification of the embodiment.
Figure 6:
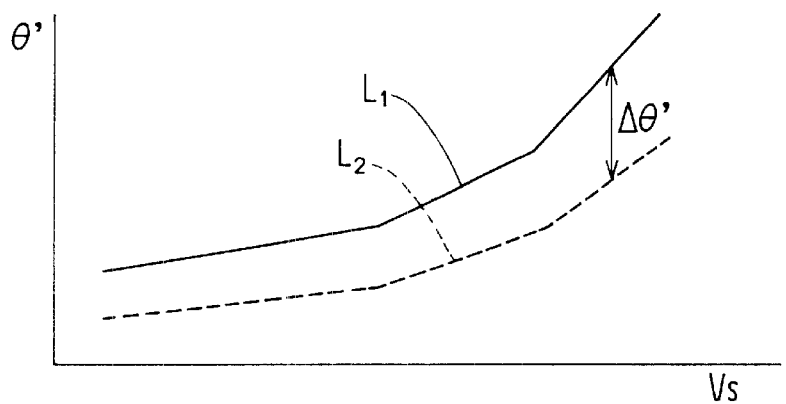
FIG. 6 is a graph showing a relationship between a calculated throttle opening degree θ' and a vehicle speed Vs, according to a further another modification of the embodiment.

In the above-described embodiment, the graphs L1 and L2 for setting the first threshold value Θ and the second threshold value φ are continuously smooth curved lines. However, as shown in FIG. 5, the graph L1 for determining the first threshold value Θ can be set by connecting plural straight lines. Further, in this case, tilt angles α1, α2, α3 of the plural straight lines (equal to or more) are set to becomes larger as the vehicle speed Vs becomes higher. Further, similarly to the above-described graph L1 for setting the first threshold value Θ, the graph L2 for setting the second threshold value φ can be provided as shown in FIG. 6. That is, the graph L2 for determining the second threshold value φ can be set by connecting plural straight lines, and tilt angles of the connected plural straight lines are set to becomes larger as the vehicle speed Vs becomes higher. In addition, as shown in FIG. 6, a difference Δθ' between the first threshold value Θ and the second threshold value φ becomes larger as the vehicle speed Vs becomes larger.

Figure 7:
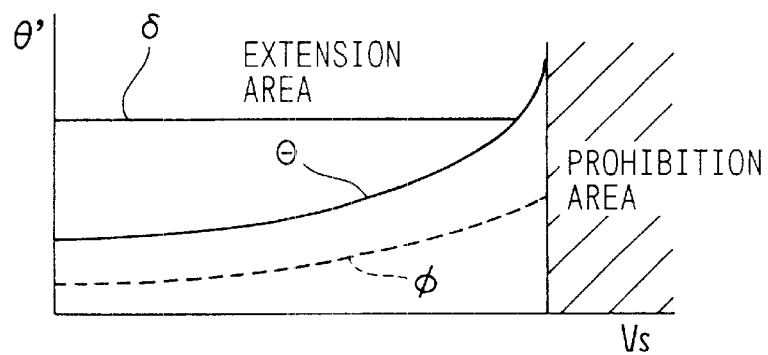
FIG. 7 is a graph showing a relationship between a calculated throttle opening degree θ' and a vehicle speed Vs, according to a further another modification of the embodiment.

In a case where a load reduction control (clutch-off operation) of the engine E/G is performed by the electromagnetic clutch 110 (load control means) based on the first threshold value Θ, when the throttle opening degree θ (engine load) detected by the potentiometer 505 (engine load detecting unit) is larger than a third threshold value δ larger than the first threshold value Θ as shown in FIG. 7, the load reduction control of the engine E/G is extended by a predetermined time before the load-returning operation (on operation of clutch) is performed. Accordingly, even when the vehicle is travelling in a high speed, is travelling on a rapid uphill road or is travelling with a heavy load capacity, the driveability of the vehicle can be improved.

In the above-described embodiment of the present invention, by using the electromagnetic clutch 110, the consumed power of the compressor 100 is controlled to be reduced. That is, by interrupting the connection between the engine E/G and the compressor 100, the consumed power of the compressor 100 is reduced. However, when a variable-displacement compressor is used as the compressor 100, the consumed power of the compressor 100 can be controlled by changing the displacement of the compressor 100. In this case, the consumed power is not reduced to zero, but can be suitably reduced.

The present invention can be applied to a vehicle using a gasoline engine or a diesel engine, and can be applied to a vehicle using the other driving source.

Figure 8:
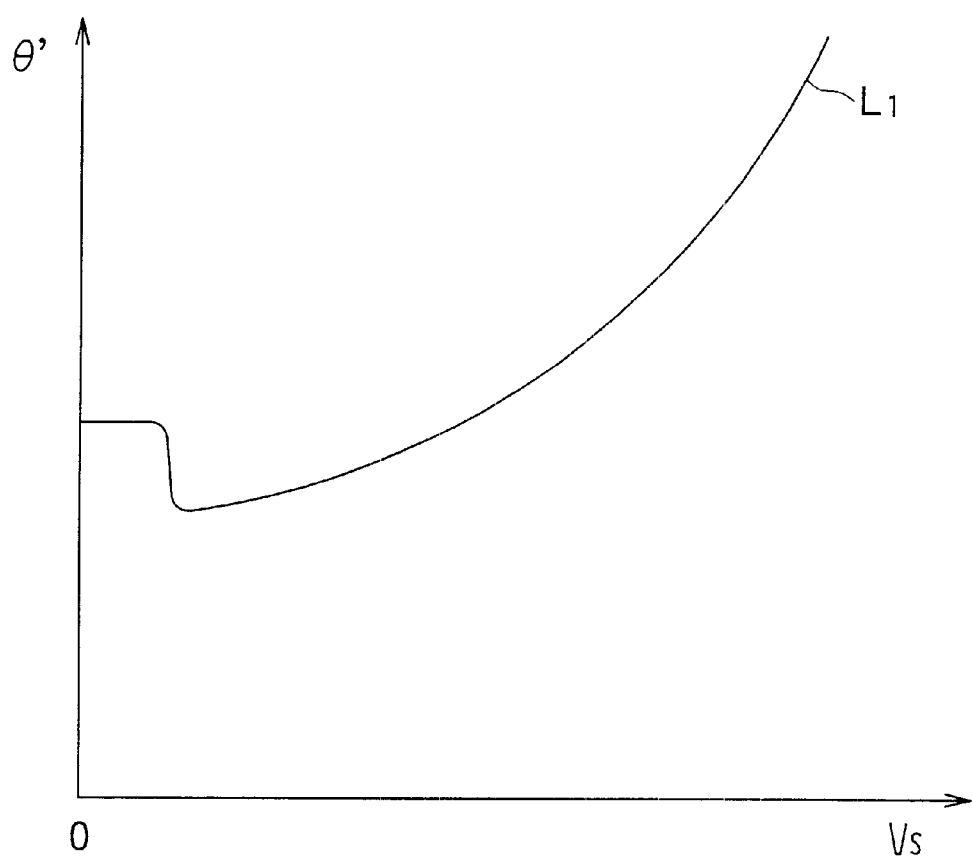
FIG. 8 is a graph showing a relationship between a calculated throttle opening degree θ' and a vehicle speed Vs, according to a further another modification of the embodiment.

Further, the control operation of the present invention can be applied when the vehicle speed Vs is larger than a predetermined speed Vp (e.g., 5 km/h). As shown in FIG. 8, when the vehicle speed Vs is in a range of 0–5 km, the first threshold value Θ' can be set larger than a throttle opening degree θ determined by the above-described graph L1.

Such changes and modifications are to be understood as being within the scope of the present invention as defined by the appended claims.

What is claimed is:

1. A refrigerant cycle for a vehicle being travelled by a driving source, the refrigerant cycle comprising:

a compressor operated by a power from the driving source to suck and compress refrigerant;

a load detecting unit disposed to detect load of the driving source;

a vehicle speed detecting unit-disposed for detecting a vehicle speed;

a power reducing unit which reduces a consumed power consumed in the compressor when the load detected by the load detecting unit is equal to or larger than a first threshold value; and a control unit for controlling operation of the compressor, which sets the first threshold value in such a manner that an increase rate of the first threshold value relative to the vehicle speed becomes larger as the vehicle speed becomes larger.

2. The refrigerant cycle according to claim 1, wherein:

the first threshold value is set based on the vehicle speed detected by the vehicle speed detecting unit to be approximately equal to a value obtained by multiplying a load of the driving source, determined based on the vehicle speed, and a predetermined number together.

3. The refrigerant cycle according to claim 1, wherein:

the first threshold value is set to be larger as the vehicle speed detected by the vehicle speed detecting unit becomes larger, in such a manner that a relationship between the first threshold value and the vehicle speed approximates to a secondary function.

4. The refrigerant cycle according to claim 1, wherein:

the control unit includes power-returning means for stopping power-reducing operation of the power reducing unit so that power consumed in the compressor is returned when the load detected by the load detecting unit is equal to or smaller than a second threshold value smaller than the first threshold value; and the control unit sets the second threshold value in such a manner that a difference between the first threshold value and the second threshold value becomes larger as the vehicle speed detected by the vehicle speed detecting unit becomes larger.

5. The refrigerant cycle according to claim 1, wherein:

the power reducing unit performs power-reducing operation of the compressor in a predetermined time;

the control unit further includes extension means for extending the power-reducing operation of the compressor when the load detected by the load detecting unit becomes larger than a third threshold value larger than the first threshold value in the power-reducing operation of the compressor.

6. The refrigerant cycle according to claim 5, wherein the third threshold value is a fixed value that is approximately fixed relative to a change of the vehicle speed.

7. The refrigerant cycle according to claim 1, wherein:

the control unit sets a prohibition area when the vehicle speed is larger than a predetermined speed; and in the prohibition area, the control unit prohibits power-reducing operation of the power reducing unit.

8. The refrigerant cycle according to claim 1, wherein:

the first threshold value is a connection line connecting a plurality of straight lines; and each of the straight lines is tilted by a tilt angle in such a manner that the tilt angle becomes larger as the vehicle speed becomes higher.

9. The refrigerant cycle according to claim 8, wherein:

the control unit includes power-returning means for stopping power-reducing operation of the power reducing unit so that power consumed in the compressor is returned when the load detected by the load detecting unit is equal to or smaller than a second threshold value smaller than the first threshold value;

the second threshold value is a connection line connecting a plurality of straight lines;

each of the straight lines of the second threshold value is tilted by a tilt angle in such a manner that the tilt angle becomes larger as the vehicle speed becomes higher; and the control unit sets the second threshold value in such a manner that a difference between the first threshold value and the second threshold value becomes larger as the vehicle speed detected by the vehicle speed detecting unit becomes larger.

10. The refrigerant cycle according to claim 8, wherein:

the control unit sets a prohibition area when the vehicle speed is larger than a predetermined speed; and in the prohibition area, the control unit prohibits power-reducing operation of the power reducing unit.

11. A refrigerant cycle for a vehicle being travelled by a driving source, the refrigerant cycle comprising:

a compressor operated by a power from the driving source to suck and compress refrigerant;

a load detecting unit disposed to detect load of the driving source;

a vehicle speed detecting unit disposed for detecting a vehicle speed;

a power reducing unit which reduces a consumed power consumed in the compressor when the load detected by the load detecting unit is equal to or larger than a first threshold value; and a control unit for controlling operation of the compressor, which sets the first threshold value based on the vehicle speed detected by the vehicle speed detecting unit in such a manner that the first threshold value is approximately equal to a value obtained by multiplying a load of the driving source, determined based on the vehicle speed, and a predetermined number together.

12. The refrigerant cycle according to claim 11, wherein:

the control unit sets a prohibition area when the vehicle speed is larger than a predetermined speed; and in the prohibition area, the control unit prohibits power-reducing operation of the power reducing unit.

13. A refrigerant cycle for a vehicle being travelled by a driving source, the refrigerant cycle comprising:

a compressor operated by a power from the driving source to suck and compress refrigerant;

a load detecting unit disposed to detect load of the driving source;

a vehicle speed detecting unit disposed for detecting a vehicle speed;

a power reducing unit which reduces a consumed power consumed in the compressor when the load detected by the load detecting unit is equal to or larger than a first threshold value; and a control unit for controlling operation of the compressor, which sets the first threshold value larger as the vehicle speed detected by the vehicle speed detecting unit becomes larger, in such a manner that a relationship between the first threshold value and the vehicle speed approximates to a secondary function.

14. The refrigerant cycle according to claim 13, wherein:

the control unit sets a prohibition area when the vehicle speed is larger than a predetermined speed; and in the prohibition area, the control unit prohibits power-reducing operation of the power reducing unit.

* * * * *